Figure 1:
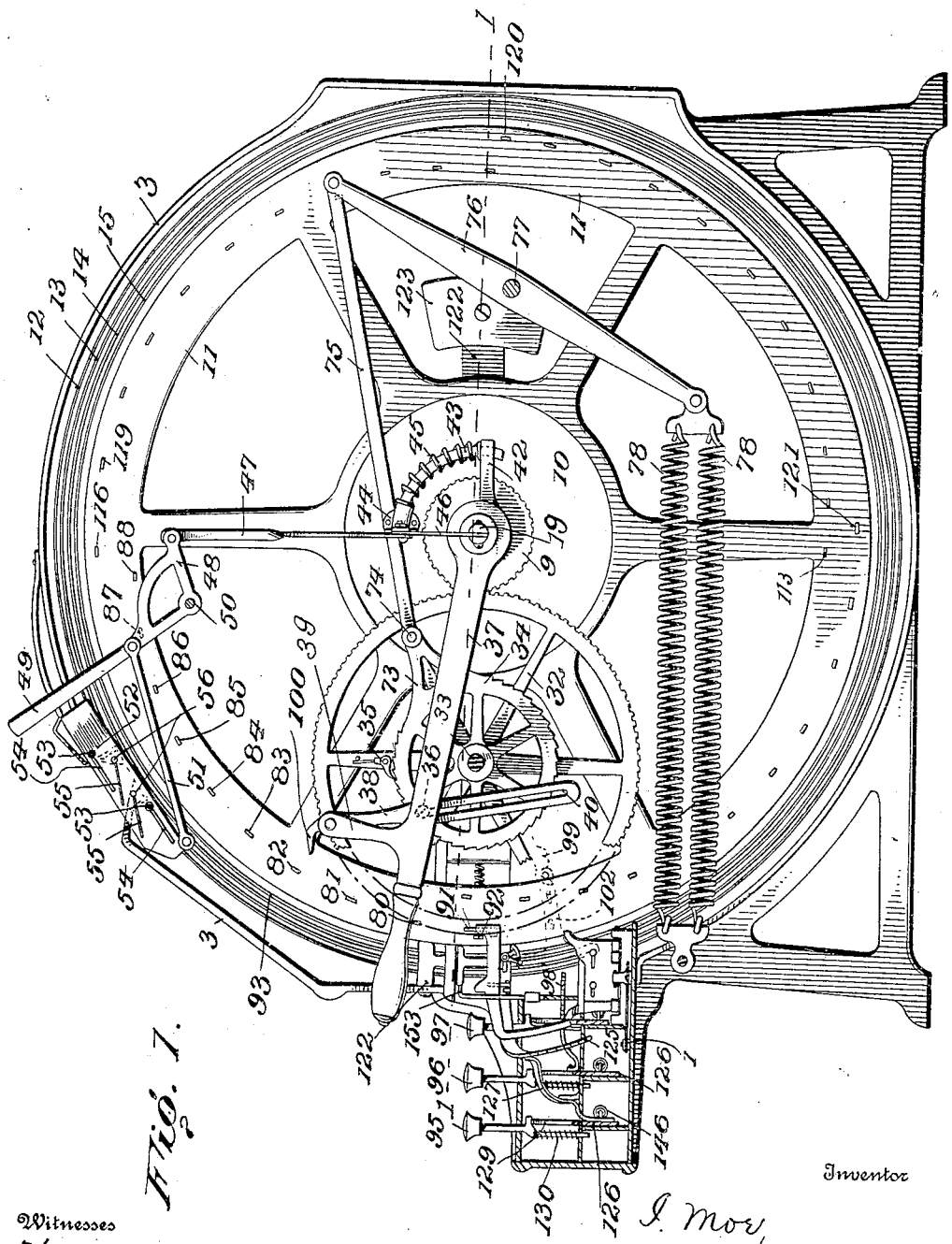

I. MOE.
CALCULATING MACHINE.
APPLICATION FILED NOV. 21, 1908.

964,296.

Patented July 12, 1910.
6 SHEETS—SHEET 1.

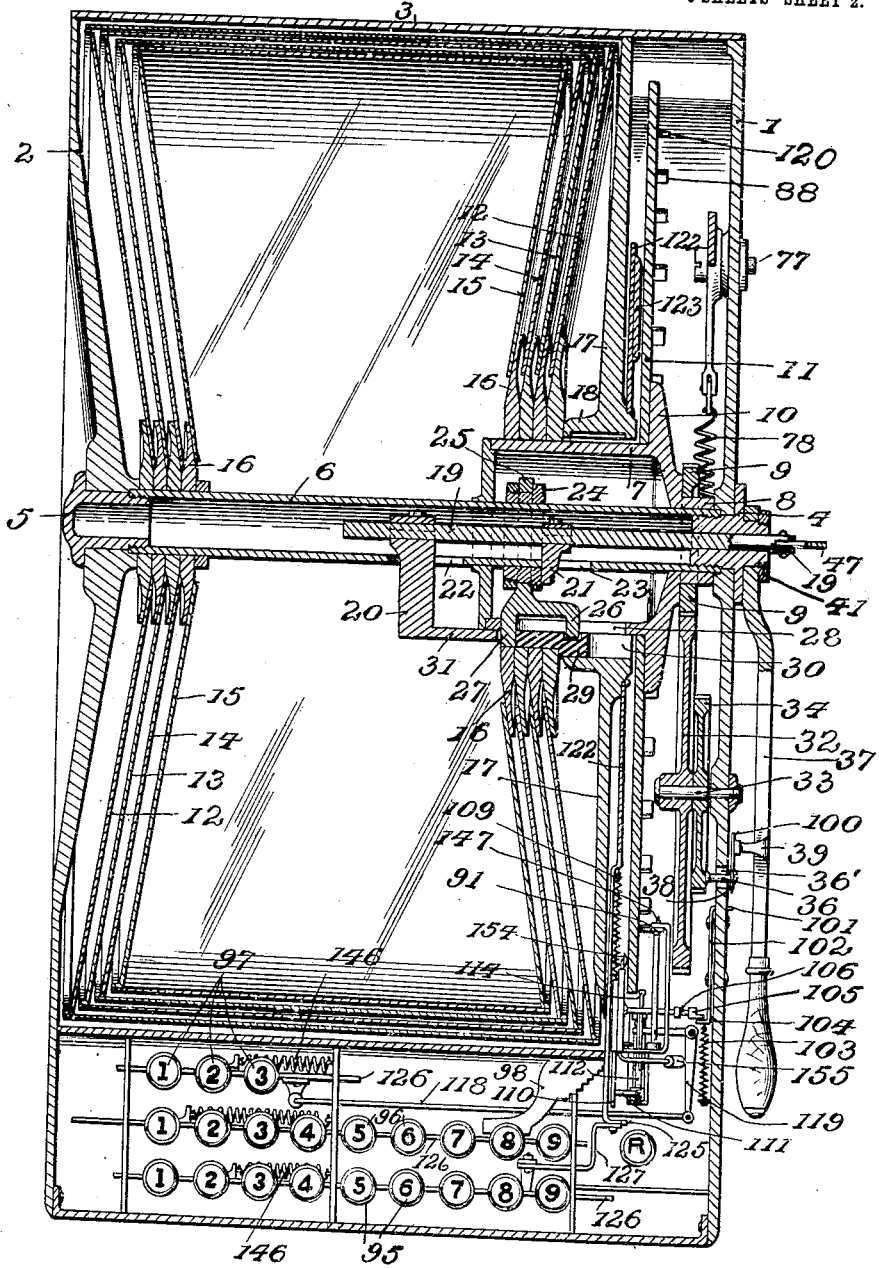

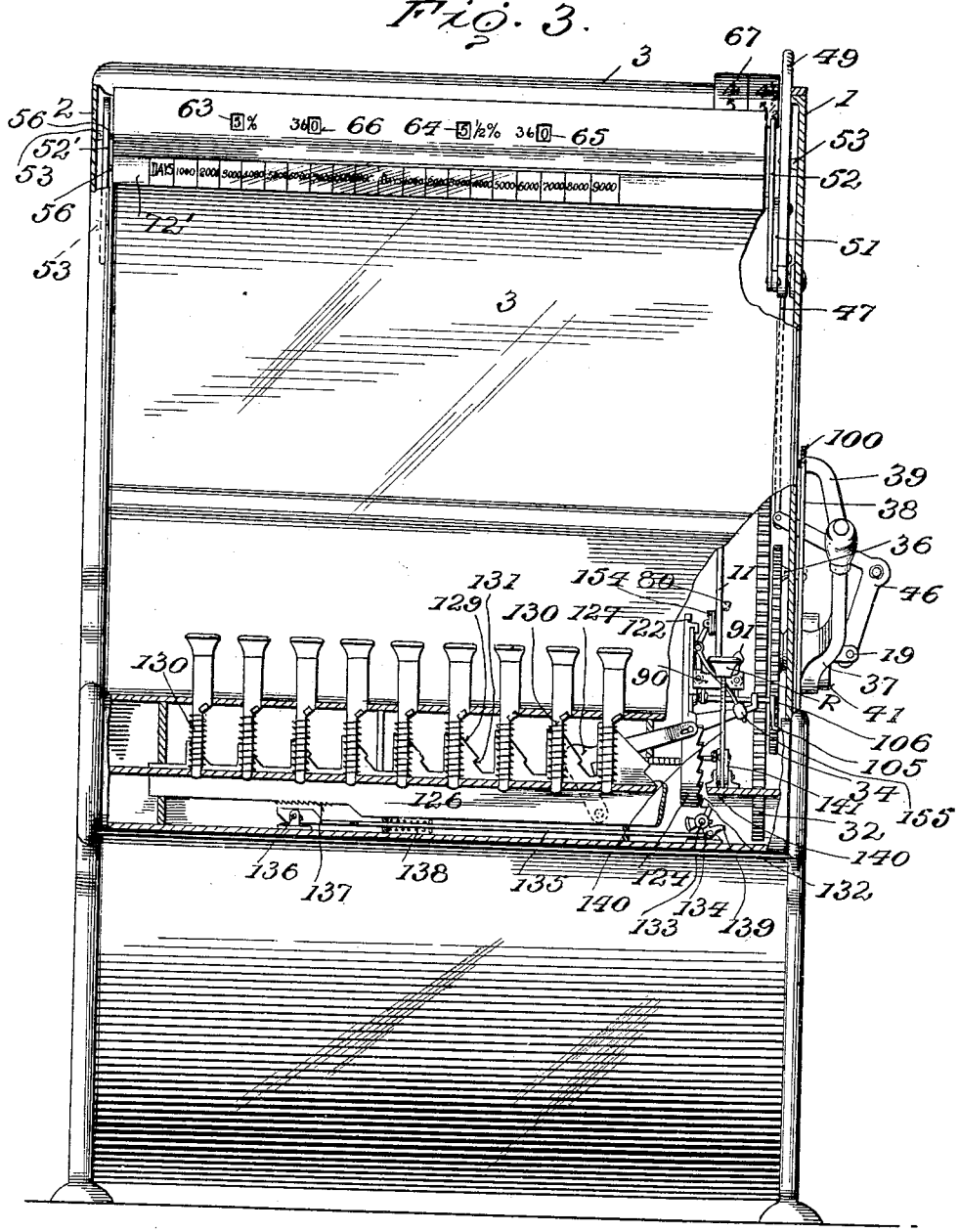

I. MOE.
CALCULATING MACHINE.
APPLICATION FILED NOV. 21, 1908.
964,296.
Patented July 12, 1910.
6 SHEETS—SHEET 4.
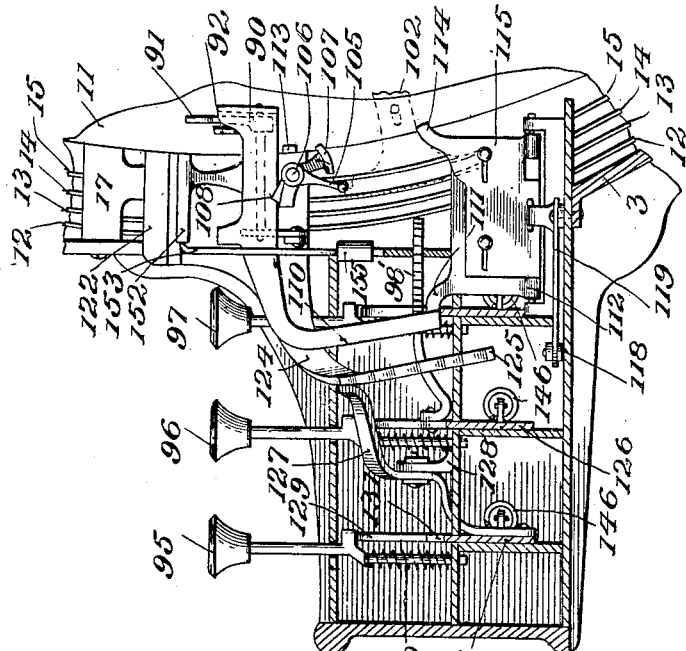
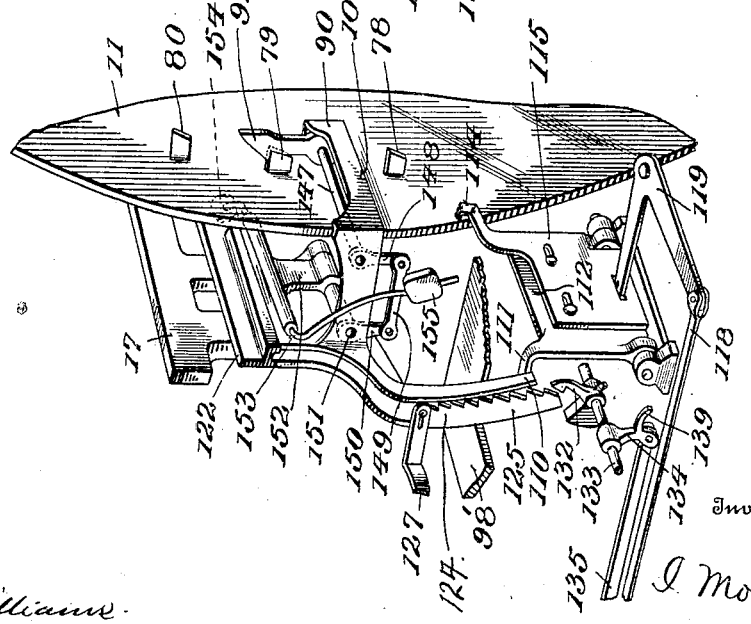

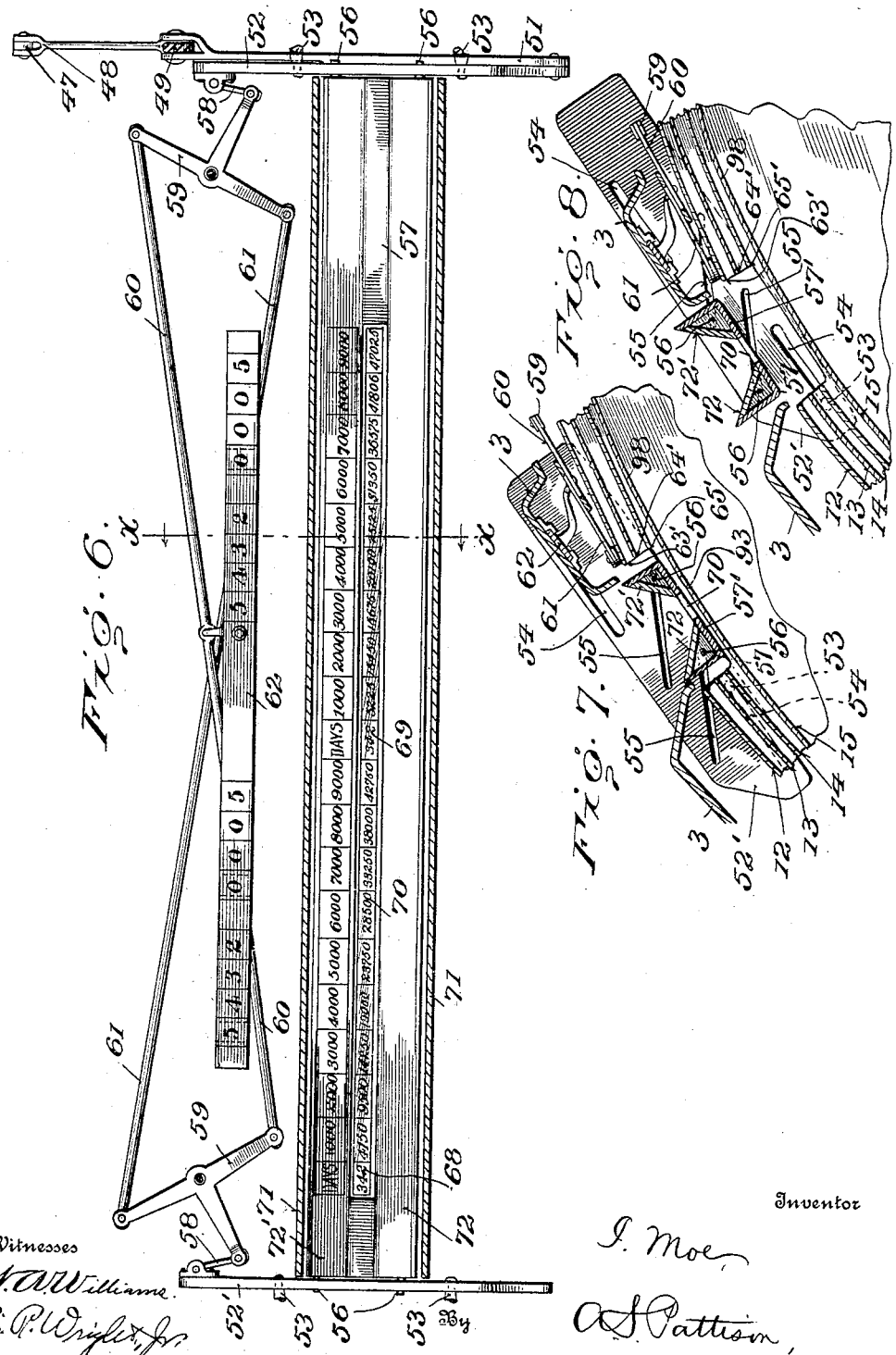

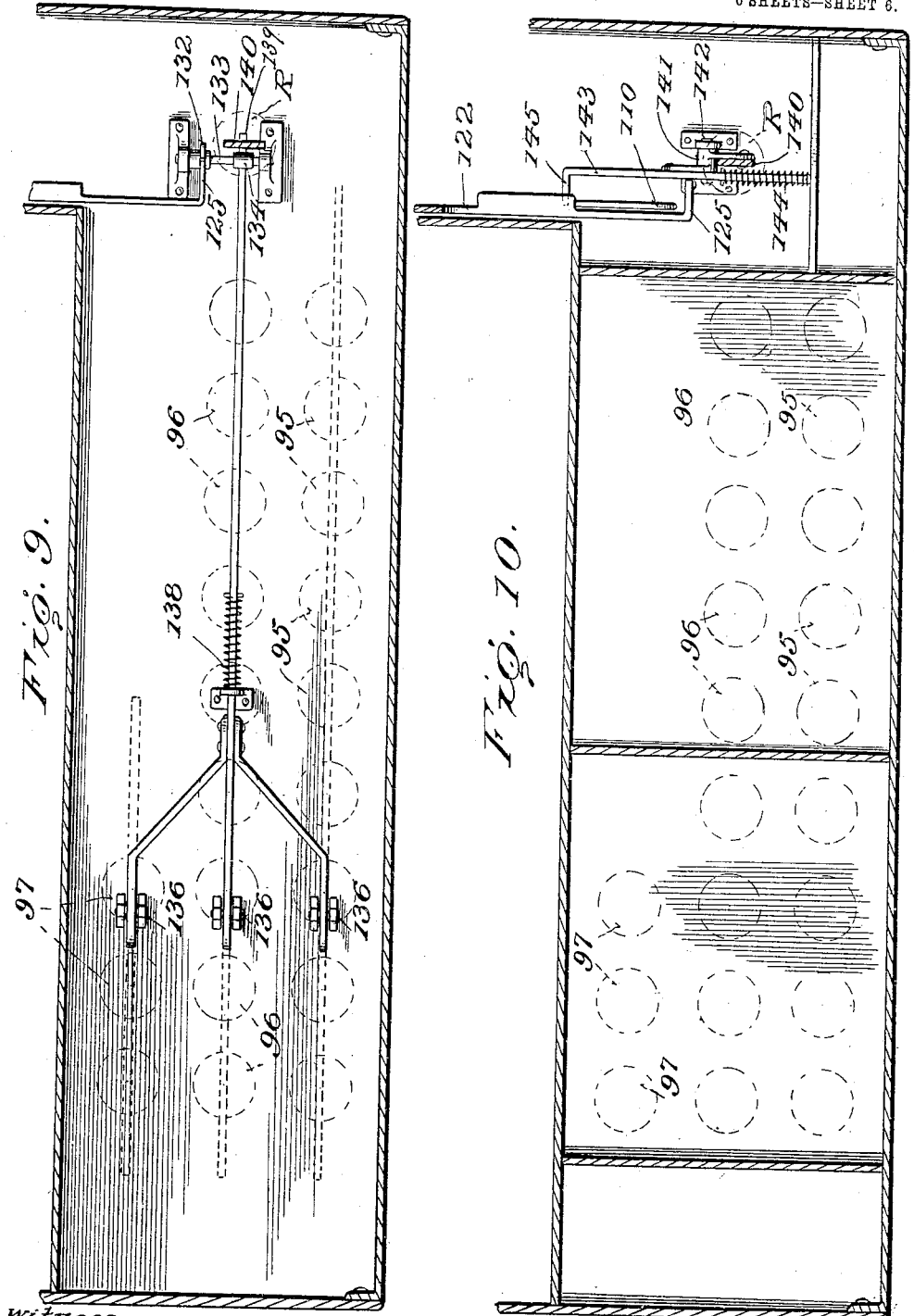

UNITED STATES PATENT OFFICE.

IVAR MOE, OF DULUTH, MINNESOTA, ASSIGNOR OF ONE-HALF TO JACOB F. NOLL, OF DULUTH, MINNESOTA.

CALCULATING-MACHINE.

964,296.   Specification of Letters Patent.   Patented July 12, 1910.

Application filed November 21, 1908. Serial No. 463,826.

*To all whom it may concern:*

Be it known that I, IVAR MOE, a subject of the King of Norway, residing at Duluth, in the county of St. Louis and State of Minnesota, have invented certain new and useful Improvements in Calculating-Machines, of which the following is a specification, reference being had therein to the accompanying drawing.

My invention relates to improvements in calculating machines, and pertains more particularly to machines for interest calculating.

The object of my invention is to provide a machine of this character which is known as a key set lever operated cylindrical calculating machine, in which the interest on predetermined amounts can be readily calculated at different rates of interest for different periods of time from 1 to 399 days, and in which the lever and key mechanism allows of the ready setting of the machine for the different rates of interest, and the period of time for which the interest is computed.

Another object of my invention is to provide a more simple, cheap and effective machine in which the interest is accurately calculated upon the predetermined amounts, and in which it is impossible to operate the machine in such a manner that the proper amount of interest will not be calculated for the rate of interest and the period of time set by the keys and lever.

Another object of my invention is to provide a more simple, cheap and effective calculator to accomplish the above results.

In the accompanying drawings, Figure 1, is an end view of the complete machine partly in section, and showing the end wall removed to show the operative parts of the machine. Fig. 2, is a horizontal sectional view taken on the line 1—1 of Fig. 1. Fig. 3, is a front view of the machine showing the casing partly broken away to show the operative parts of the machine. Fig. 4, is an enlarged sectional view of the forward portion of the casing showing the key-setting mechanism. Fig. 5, is an enlarged perspective view of the key-setting mechanism. Fig. 6, is an enlarged plan view partly in section of the upper end of the machine, showing the rule and that portion of the cylinder designed to be seen through the same, and showing the arrangement of the lever for operating the same, and for locking the proper drum on the driven shaft. Fig. 7, is a vertical, sectional view taken on the line *x—x* of Fig. 6. Fig. 8, is a view similar to Fig. 7, only showing the rule in its outer position to expose the numerals on the outer cylinder. Fig. 9, is a sectional view showing the key release mechanism. Fig. 10, is a sectional view showing the carriage release mechanism.

Referring now to the drawings, the numerals 1 and 2 represent the end walls of the casing which are preferably composed of cast metal, being spaced some distance apart and surrounded circumferentially by a thinner metal wall 3 which collectively forms the housing for the machine. Centrally located in the end wall 1 is the hollow plug 4, and directly opposite the plug 4 in the end wall 2 is the plug 5, these plugs being externally threaded at their inner ends and carrying thereon the hollow shaft 6. Mounted upon the shaft 6 adjacent the end wall 1 is the hollow drum 7 which is adapted to revolve or oscillate upon the shaft 6. The outer end of the hollow drum 7 is provided with a smaller projecting portion 8 which bears against the wall 1 and upon which is keyed the operating gear 9. The drum 7 on the inside of the gear 9 is provided with a circumferential flange 10 to which the setting disk 11 is firmly secured, the object of which will be hereinafter more fully described.

Within the housing, one within the other, are four calculating cylinders 12, 13, 14 and 15. The outer periphery of the cylinders are provided with characters arranged in longitudinal rows indicating the interest upon certain amounts, as will be hereinafter more fully described. The cylinders, as shown, are each provided at their ends adjacent the end plates 1 and 2 with the enlarged bearing portions 16. These bearing portions at the end adjacent the end wall 2 are mounted upon the shaft 6, while opposite ends adjacent the wall 1 are mounted upon the drum 7. The cylinders may be constructed in any convenient manner of light material, but preferably as shown. Between the end of the outermost calculating cylinder 12, and the setting disk 11, is a fixed frame 17 having a hollow hub portion 18 sufficiently large to completely surround the drum 7, but not necessarily bearing thereon, as said frame is rigidly fastened to the circumferential wall 3 of the casing. Extending through the plug 4 from the outside of the casing, and extending into the shaft 6, is a smaller shaft 19 which extends about midway the shaft 6. The shaft 19 carries radial arms 20 and 21, the former extending radially from the shaft 19 out through the slot 22 in the shaft 6, and the arm 21 extending radially through the slot 23 in the shaft 6. Within the drum 7 and loosely mounted upon the shaft 6, is a two-flange collar 24 which is rigidly attached to the radial arm 21, and therefore said collar is moved longitudinally upon the shaft 6 when the shaft 19 is moved. Between the flanges of the collar 24 is mounted a key-fork 25, it being journaled between the flanges of the collar so as to admit of its revolving without the collar moving, yet held in place longitudinally thereby. The key fork is provided with two projections 26 and 27 both of which extend radially through the slot 28 in the drum 7. The projection 26 being designed to engage the feather-key 29 carried in the hub 18 of the fixed frame 17, the prong 27 engages one or the other of the hub pieces 16 of the cylinders 12, 13, 14 and 15, whereby one of the cylinders is at all times engaged with the drum 7.

The feather-key 29 is made to slide in the key-way seat 30 in the frame 17, so that it cannot revolve with the drum 7, but must remain in whatever position it is left by the fork 25, and is sufficiently long to fill the space between the ends 26 and 27 of the fork 25. The radial arm 20 is provided with an angular extension in the form of a feather 31 which reaches out and follows directly adjacent the prong 27 of the fork 25, so that in the travel of the shaft 19 back and forth, all of the cylinders 12, 13, 14 and 15 will at all times be engaged by some part of the attachment to the said rod as they are each provided with a key-seat through which the feather 29, the prong 27 and the feather 31 operate, they being all in line and designed to travel back and forth simultaneously. It will be seen that as the fork 25 is revolubly mounted in the collar 24, and that both prongs 26 and 27 are free to leave the alinement of the two feathers 29 and 31, that if while the prong 27 properly engages any one of the cylinders 12, 13, 14 or 15, it will be free to revolve with the drum 7 and carry with it whichever cylinder it is engaging, leaving the other cylinders mounted stationarily upon either one or both of the feathers 29 and 31, as the case may be.

In Fig. 2, the fork is shown as engaging the innermost cylinder 15 and is ready to be revolved, while the cylinders 12, 13 and 14 are held stationary upon the feather 29. Thus it will be seen that by the proper longitudinal adjustment of the rod 19 any one of the cylinders 12, 13, 14, or 15 may be engaged with the drum 7 and disk 11.

For the purpose of imparting rotary motion to the drum 7 I provide the gear wheel 9 above referred to, which meshes with the larger gear wheel 32 mounted upon the short shaft 33, which latter is fixed to the end wall 1 and extends inwardly and also carries the ratchet wheel 34 interposed between the gear wheel 32 and the end wall 1. The ratchet wheel 34 engages with the gear wheel 32 through the medium of the spring pawl 35 mounted upon one spoke of the gear wheel 32 so arranged that during a clock-wise motion of the ratchet wheel 34 it will carry with it the gear wheel 32, but during its reverse motion will allow the gear wheel 32 to remain stationary.

The ratchet wheel 34 is provided with the crank pin 36 extending out through a segmental slot 36' in the wall 1 and is attached to the operating lever 37 by means of the slotted pitman 38 which is pivotally connected to the upper end of the arm 39 of said operating lever.

The slot 40 in the pitman 38 is to admit of the lever 37 returning to its normal position without carrying with it the ratchet wheel 34, but giving the latter its own time to return. The operating lever 37 is loosely mounted upon a suitable extension of the plug 4 and held in place by the nut 41, and also provided with means for maintaining a normally elevated position which comprises the extension 42 integral with the lever 37, having a hole in the outer end thereof through which the rod 43 reciprocates, the opposite end of the rod 43 being fixed and part of the bracket 44 securely attached to the end wall of the casing, the spiral spring 45 surrounding the rod 43 and having its one end impinge against the bracket 44 and its other end against the extension 42 which pressure will at all times tend to hold the lever 37 in the position shown in the various drawings. The bracket 44 has a second office of pivotally carrying the bell crank lever 46, the lower arm of which is pivotally attached to the rod 19 and imparts longitudinal motion thereto, and the longitudinal arm of which is pivotally attached to the upwardly extending rod 47, it in turn being connected to the crank arm 48 of the indicating ever 49 which is pivotally mounted upon the inner side of the end wall 1 by means of the pivot 50. The lever 49 has also pivotally attached thereto the rod 51 which at its opposite end is pivotally attached to the sliding plate 52, this plate being slidably mounted upon the casing on the stationary pins 53 projecting through the elongated slots 54 in the plate in such a manner as to admit of the plate having the desired end movement when actuated by the lever 49 through the medium of the rod 51 as above referred to. The plate 52 is also provided with two inclined slots 55 through which project two pins or pintles 56 which are rigidly secured to the end of the vertically-adjustable rule 57, this rule being vertically adjustable within a channel formed in the circumferential wall 3 of the casing, and in the walls of the three outer cylinders when the latter are not in use.

At the opposite end of the rule 57 to the one just described, is a second sliding plate 52' which is attached in every respect except as to the attachment of the rod 51, similar to the plate 52, and is given exactly the same motion by means of any suitable combination of levers as shown in Fig. 6, and numbered 58, 59, 60 and 61, the rod 60 having connected thereto the slide 62 having marked upon its upper surface figures representing the different percentages in which the machine is to calculate as 5, 4, 3, and 2, and the units in the number of days as 0, 0, 0, and 5, this slide working longitudinally beneath openings 63, 64, 65 and 66 in the casing 3, and spaced in such a manner as to show the correct numerals within the openings as regulated by the movement of the lever 49. Adjacent the lever 49 and upon the casing 3 is fixed an indicator plate 67 being divided into four equidistant spaces circumferentially in which are located the percentage numbers corresponding to those upon the slide 62, there being four on the slide and four on the plate so that when the lever 49 is moved opposite any one of the spaces on the plate the same number as indicated on that certain space will show through the openings 63 and 64 in the casing 3, there being adjacent the opening 64 the fraction ½ so that the percentage indicated upon the right side of the machine is at all times ½ per cent. greater than that indicated upon the opposite side and the figures upon the cylinders are made to correspond correctly. The indicator plate 67 also carries the fractional rate of interest opposite the whole number rate.

It will be seen that the three outside cylinders 12, 13 and 14 are formed with coinciding openings 63', 64' and 65' so that when standing in a normal position the rule 57 may pass down through said openings and closely approach the inside cylinder 15, so that the figures thereon will appear close to the opening in the rule and be readable therethrough. Thus it will be seen that as the lever 49 is moved back and forth it will both raise and lower the rule by the pins 56 sliding up and down the inclined slots 55 in the plate 52 and operate the rod 19 back and forth through the lever connection above described. When the inner cylinder 15 for illustration is engaged with the drum 7 as shown in Fig. 2, the rule will be adjacent the circumferential face of said cylinder, as shown in Fig. 7, or if the lever 49 be moved so as to engage the cylinder 12 with the drum 7, then the rule will be raised so as to admit of the cylinders 13, 14 and 15 revolving beneath it, as shown in Fig. 8, and the figures on the cylinder 12 will be readable through the rule, the same operation applying to all of the cylinders.

There are four cylinders and eight different rates of percentages; that is, each cylinder carrying figures to suit two different rates, the whole number percentage at one side thereof and the whole number and fraction of ½, as before mentioned on the opposite side. The first column of figures on the left-hand side of the cylinders representing the number of days as at 68, Fig. 6, the next nine columns toward the right representing the amounts of interest for the sums of money upon the rule directly above them at the whole number rate of interest indicated in the opening 63, said figures computed at the number of days per year indicated at the opening 66 either 360 or 365, then the eleventh column 69 represents days again and the next nine columns the amounts of interest on the sums of money indicated upon the rule directly above them at the rate of interest indicated at the opening 64 computed at the number of days per year indicated at the opening 65 either 360 or 365.

The rule 57 is preferably composed of the base 57' in which a slot or opening 70 is formed, through which the figures upon the cylinders are seen, the two walls 71, and the inclined walls 72 and 72'. Upon the wall 72' to the left and in the center appears the words "Days" at the right of both of which are arranged the different amounts of money upon which it is desired to ascertain the amount of interest.

The ratchet wheel 34 is provided at substantially right angles to the crank pin 36 with an extension crank arm 73 carrying the crank pin 74 to which the rod or pitman 75 is attached at one end, its opposite end being connected to the upper end of the lever 76 which is pivotally mounted at 77 to the inner side of the end wall 1, as more clearly shown in Fig. 2, the lower end of the lever 76 being connected to suitable spiral springs 78 which will impart to it a long gradual return motion when properly extended by a depression of the lever 37.

When the lever 37 is depressed it will revolve the ratchet wheel 34 through the pitman 38 connection which will, through the rod 75 and lever 76 connection, extend the spring or springs 78, they being securely fastened at their opposite ends to the frame of the machine. Then when the lever 37 is allowed to return to its normal position, the power of the springs 78 is allowed to act upon the ratchet wheel 34 in an effort to return it to normal which, through the pawl 35 engages the gear wheel 32 and carries it with it, which in turn imparts motion to the drum 7 through the gear wheel 9, and thus rotary motion is provided for the moving parts of the machine designed to engage with the drum 7.

The disk 11, as before stated, is securely fastened to the drum 7, and is designed to control the motion of the same in that it is provided with certain stopping pegs which engage the key-setting mechanism.

The pegs just referred to are arranged in series upon the outer face of the disk as close as convenient to the circumferential edge thereof and project laterally therefrom. There are four series of ten each to these stopping pegs about the face of the disk, the first series of which are numbered 80, 81, 82, 83, 84, 85, 86, 87, 88 and 92, the other series being situated radially the same and for a similar purpose. For better comprehension of the use of these pegs, we will consider first the inside cylinder 15, as shown in Fig. 1 of the drawings. The disk and cylinders when revolving always turn in a counter clockwise direction, and the disk at all times carries one or the other of the cylinders with it. 90 represents the setting carriage which has mounted therein the dog 91, said dog at all times being ready for engagement with some one of the pegs on the disk 11, and when the carriage 90 is in its normal unset position the dog 91 will always engage and hold fast the peg 92, this peg being so spaced upon the disk 11 in relation to the lines of figures on the cylinders that when engaged by the dog 91 and the carriage unset, no line of figures whatever will show through the rule 57 and the machine will indicate blank; that is, the blank space marked 93 upon the cylinder 15 will show through the rule. Now the first line of figures upon the cylinder 15 is in the space marked 94 so that when the dog 91 engages the peg 92 and the carriage 90 has been moved downward one point by a manipulation of the #1 key in the units row 95, the line of figures in the space 94 will show through the rule 57 as the cylinder 15 will have been advanced one point by the carriage having carried with it the disk 11. If the units key carrying the numeral 2 is pressed down this operation will depress the bell-crank 127 which in turn depresses the carriage 90 and carries with it the disk 11 and cylinder 15, and thus exhibit through the rule 57 the next line of figures on the cylinder represented at 98, and if the #3 key is depressed it will move the cylinder three points thus exposing through the rule the third row of figures and so on till the ninth key has been depressed, there being keys numbered from one to nine inclusive in the units row, also one to nine inclusive in the tens row, and one to three inclusive in the hundreds row, the limit of the reading of this machine being 399 days.

The limit of the vertical movement of the carriage 90 now having been reached by the manipulation of all of units keys as just related, and the machine having assumed its normal position by the release key R having been depressed, if #1 key in the tens row 96 is now depressed, whose specific action will be described hereinafter, the notch bar 98′ will be set to allow the carriage 90, when freed, to travel longitudinally one notch farther than when the notched bar 98′ is at normal. Then when the lever 37 is fully depressed to a position shown in dotted lines 99, Fig. 1, the angular hook 100 formed on the pitman 38 will engage the pin 101 on the slidable segment 102 and move it longitudinally as it is so mounted upon the inner wall of the end 1 as to admit of such movement and retained in a normal position when not in use by a suitable spring 103. The outer or segmental end of the slidable segment 102 being formed with an inwardly-projecting flange 104 which engages the crank arm 105 mounted upon the rockable shaft 106, which at its opposite end carries a gravity pawl or dog 107 which engages the notch 108 in the carriage 90, the object of which is to prevent the longitudinal movement of said carriage until such time as the pawl 107 is disengaged by the action of the angular hook 100 just previously described, the carriage 90 being movable longitudinally by the action of a suitable spiral spring 109. The said spring has its upper end secured to the plate 122 and its lower end connected to the depending arm 110, and said arm carrying the carriage 90, whereby the carriage is acted upon by the spring, as will be seen in Fig. 5 of the drawings.

If the pawl 107 is disengaged from the carriage 90 by the action of the hook 100 just described, the carriage will travel inwardly till the dog 91 is freed from the peg 92 when the depending arm 110 of the carriage 90 engages the lateral arm 111 of the cradle 112 and stops it. The disk 11 being now free from the pawl 91 and having received power from the depressing of the lever 37 through the extending of the springs 78, will revolve till the peg 113 engages the arm 114 of the slidable portion 115 of the cradle 112, which engagement will rock the cradle, disengage the lateral arm 111 of the cradle from the depending arm 110 of the carriage, and allow the carriage 90 to continue another point longitudinally till the arm 110 engages the first notch in the notched bar 96 which was set by the depressing of the #1 key in the tens row. Now as the disk 11 continues to revolve and the pawl 91 has become established in the path of the first of the tens pegs 80, it will engage said peg and stop the disk so that the tenth line of figures in the space upon the cylinder 15 will be seen through the rule 57.

From the foregoing, it is evident that any of the units keys may be used in connection with any one of the tens keys as the units keys adjust the carriage vertically, as before described, while the tens keys regulate the adjustment longitudinally, the rows of figures upon the cylinders being made to correspond and register properly.

The distance diametrically upon the disk 11 between the units peg 92 and the first tens peg 80, is practically twice as great as the thickness of the pegs, so as to allow the dog 91 to pass between them when not set to engage either one. The tens pegs are arranged so as to admit of no space whatever between them diametrically, so that each notch in the bar 98' is equal to the width of a peg, there being ten pegs in each series and ten notches in the bar 98'. Thus it will be seen that 99 different spaces or rows of figures upon any of the cylinders may be exposed through the rule 57 by proper manipulation of the units and tens keys, the pawl 91 engaging only the first series of tens pegs.

Now assuming the machine to be at normal, if the #1 key in the hundreds row is depressed the adjustable arm 115 of the cradle 112 will be extended one point into alinement with the one hundred peg 116 through the medium of the lever connection clearly shown in Fig. 2 and numbered 117, 118, and 119; then if the lever 37 is depressed the angular hook 100 will engage the slidable segment 102 which in turn will trip the gravity dog 107, release the carriage 90, and allow the disk 11 to revolve, carrying with it whichever cylinder is connected to the drum 7, the pawl 91 passing through the space between the peg 92 and the peg 80 till the peg 116 passes the extendible arm 115 of the cradle 112 and rocks it. The dog 91 being free to pass between the pegs 92 and 80, the leg 110 of the carriage 90 holding it from further advancement by engaging the arm 111 of the cradle 112. By the depressing of the #1 key just above mentioned, it will be seen that the arm 111 of the cradle 112 was prevented from coming into contact with the peg 113. As the one hundred peg 116 passes the arm 114 of the cradle 112 it will force the same over, rocking the cradle and releasing the arm 110 of the carriage from engagement therewith. This will let the carriage advance one more point till the leg 110 engages the notched bar 98 which will hold the carriage at a point with the dog 91 in the path of the tens peg 119, this peg being exactly the same distance from the center of the disk 11 as the peg 80, the four series of tens pegs being identical. When any number of days above one hundred and less than two hundred are desired, the #1 key in the hundreds row is first depressed, which sets the cradle and governs the first action of the carriage, then the tens and units keys may be used as desired, which will act exactly as previously described when engaging the first series of pegs.

When days above two hundred and less than three hundred are desired, then the #2 key in the hundreds row is used, which will set the cradle arm 114 still one notch farther out to engage the peg 120 and be rocked thereby so that the dog 91 will engage the third series of pegs.

When days above three hundred and less than four hundred are desired, then the #3 key in the hundreds row is used, which sets the device in the same manner as before described, but so that the cradle will be operated by the peg 121 and the dog 91 engage the fourth series of pegs which will indicate to 399 days, this being the limit of the reading of this particular machine.

The pegs 113, 116, 120 and 121 are each spaced their own thickness nearer the center of the disk than the other commencing with 113, and each having an inclined face similar to the tens pegs as shown in Fig. 4, in order to trip the cradle 112 in passing the arm 114 of same.

The four different cylinders 12, 13, 14 and 15 have the same number of lines of figures, but each cylinder represents a different rate of percentage. The cylinder 15 carries the 5 and 5½ rate, 14 the 4 and 4½ rate, 13 the 3 and 3½ rate, and 12 the 2 and 2½ rate, and when the lever 49 is adjusted to the desired rate of interest, as before described, the corresponding cylinder is brought into engagement with the drum 7 and disk 11 and the key-setting mechanism works identically for all of the cylinders. The carriage 90 is slidably mounted upon the pivoted arm 122, this latter being pivoted upon the hub projection of the fixed frame 17 and provided with a counter weight 123 upon the end opposite to that upon which the carriage is mounted, to keep the carriage end normally in an elevated position. The extreme carriage end of the arm 122 is formed with a downwardly-depending extension 124 provided with a series of nine notches 125 which regulate the vertical movement of the arm and carriage when actuated by any of the units keys. The key bar 126 is attached to this depending extension 124 by means of the bell-crank 127 pivotally mounted in the fixed standard 128, so that a longitudinal movement of the key bar imparts a vertical movement to the carriage end of the arm 122. The extent of this movement being regulated by the inclined teeth 129 upon the upper edge of the key bar 126, one of these teeth occurring under each key, and the bar being actuated longitudinally by the depressing of the key upon the inclined teeth, each key shank 130 being provided with a suitable spiral spring to return it to normal when the bar has been released, the inclined teeth 129 having notches 131 therein which engage each key and retain it after having been depressed till the bar is operated by the release key R. A gravity pawl 132 for engagement with the notched portion 124 is mounted upon a short shaft 133, this pawl engaging and holding the extension wherever set by any of the units keys. Upon the shaft 133 is also mounted the releasing mechanism which comprises the crank arm 134 attached to the pitman 135, which at its opposite end is divided into three separate arms, one under each key bar. The ends of these arms being so mounted upon pins 136 in inclined slots as to give them an upward movement to engage a rack 137 on the under side of each of the key bars when the pitman 135 is thrust forward by the action of the release key R, the pitman 135 returning to normal by the action of a suitable spring 138.

The crank arm 134 is formed with an extension 139 upon which the shank 140 of the release key R strikes when the key is depressed to release the mechanism. Thus it will be seen that a pressure upon the extension 139 will force the pitman 135 forward, the outer ends of which will engage the racks 137 and carry with them the key bars sufficiently far to disengage all of the keys that might have been caught in the notches 131, all of which is clearly shown in Figs. 3 and 5. A further releasing mechanism actuated by the key R is shown in Fig. 10, which consists of the bell-crank 141 mounted upon the short shaft 142, one end of the crank being attached to the shank 140 of the release key and the opposite end to a hooked rod 143 which is slidably mounted in the frame of the key-board and held in a normally extended position, as shown in the drawings by means of a suitable spring 144. The hooked end 145 of this rod is designed to engage the arm 110 of the carriage 90, and when the release key R is depressed, draws the carriage back till the arm 110 of the carriage is lodged behind the laterally-extended arm 111 of the cradle 112, where it is retained till such time as the cradle is rocked as before explained. The key R is returned to its elevated normal position by its connection to the rod 143 which is returned by the spring 144. The back side of the arm 111 of the cradle is beveled in such a manner as to admit of the arm 110 of the carriage 90 passing it freely by pushing it a trifle to one side when the arm 110 is being drawn back behind it by the hooked rod 143; that is to say, the arm 110 of the carriage will rock the cradle as it passes on its backward stroke, the cradle being held in an upright position at all times by any suitable spring arrangement, or by its own weight if mounted upon its shaft a trifle eccentrically.

The three key bars 126 are held in a disengaged position by suitable springs 146 interposed between each bar and the frame of the machine. The bar under the row of hundreds keys being directly connected to the extendible portion 115 of the cradle 112, when released will withdraw said portion and keep it in a normal position, which is in the path of the peg 113 when not in use. The pawl 91 is mounted upon one end of the rockable shaft 147 in the carriage 90, upon the other end of which is the depending crank-arm 148 having attached to it the pitman 149 connected to a second crank-arm 150 operating a similar rockable shaft 151.

Upon the shaft 151 is mounted an upwardly-extending T-shaped arm 152 in which is loosely carried, the rod 153 carrying upon its inner and upwardly-extending end a brake-shoe 154 and upon its outer end the downwardly-extending counterweight 155, thus as the pawl 91 engages one of the inclined end pegs upon the disk 11 the pawl will be thrust slightly outward, rocking the shaft 147, and through the connection just described, rocking the arm 152 toward the disk which will bring the brake-shoe in contact with the inner wall of the disk 11, which will assist in retarding the motion of the disk, the pressure of the shoe being automatically adjusted by the action of the counterweight 155. This device is to assist the machine in making an easy stop as there is considerable material in motion when the disk is revolving.

In normal position the cylinders 12, 13 and 14, are arranged with the longitudinal openings 63, 64 and 65 opposite each other so that the inner cylinder 15 is exposed. This allows the rule 53 to pass down through said openings and closely approach the inside cylinder 15, so that the fingers thereon will appear close to the opening in the rule and be readable therethrough. The cylinders 12, 13 14 and 15, as heretofore stated, have at their extreme left hand edge the number of days, and opposite each number of days in a longitudinal line on the cylinder is the computed interest on the corresponding sums on the ruler. Each cylinder is to represent a certain rate of interest, therefore when a certain rate of interest is desired that cylinder is set into operation and the other cylinders locked against rotation. The cylinders on the right-hand side have the computed interest on the same sum with a half per cent. added.

When it is desired to find the interest on a certain amount, or on any amount indicated on the rule at a certain per cent., the plate 62 is moved longitudinal of the machine so that rate of interest is brought below the openings 63 and 64 in the casing 3. The longitudinal movement of this plate through the medium of the levers 59, 47, 48 moves the shaft 19 outwardly so that the cylinder representing that rate of interest is locked to the drum 7, and therefore as the three per cent. of interest is shown through the casing, the cylinder upon which is computed interest at the rate of three per cent. is locked to the drum. The manipulation of the number 3 hundreds keys, the number 4 of the ten keys, and the number 2 of the units keys which in turn operates the mechanism heretofore described, causing the member 92 to engage the proper pin on the disk 11 and top of the cylinder in a position so that 342 days is opposite the slot in the rule and the computed interests on the sums on the rule are directly above, as clearly shown in Fig. 6. The operation of the plate 62 moves the rule up and down so that it is in a position to fit close to the periphery of the cylinder that is being operated, the operation of which has heretofore been fully described.

Having thus described my invention, what I claim and desire to secure by Letters Patent, is:—

1. A calculating machine comprising a series of cylinders rotatably mounted one within the other, means for operating said cylinders independent of each other, said cylinders having cut-away portions in their outer peripheries, and a ruler radially adjusted within said cut-away portions for exposing the figures on the periphery of the cylinders.

2. A calculating machine comprising a frame, a shaft rotatably mounted therein, cylinders rotatably mounted upon the shaft one within the other, and having cut-away portions to expose the figures of the cylinders, means for locking the cylinders individually upon the shaft, a rule radially adjusted in the cut-away portions of the cylinders and adapted to expose the figures on the periphery of the cylinders.

3. A calculating machine comprising a frame, a shaft rotatably mounted therein, cylinders loosely mounted upon the shaft one within the other and having cut-away portions to expose the figures on the periphery of the cylinders, means for locking the cylinders on the shaft independent of each other, a lever for operating the shaft for oscillating the locked cylinders, a lever for indicating the rate of per cent. of interest and setting the cylinders to correspond, and keys for setting the cylinders to the amount upon which the interest is to be computed.

4. A calculating machine comprising a frame, a shaft therein, cylinders mounted upon the shaft, a lever-operated means for independently locking the cylinders upon the shaft, means for operating said shaft, and key-operated mechanism for regulating the movement of the shaft for setting the cylinders at a predetermined position.

5. A calculating machine comprising a frame, a shaft therein, cylinders loosely mounted upon the shaft, a lever-operated means for independently locking the cylinders upon the shaft, means for operating said shaft, a rule for exposing a longitudinal row of figures upon the periphery of the operated cylinders, a lever for setting the machine and indicating the rate of interest, a key-operated mechanism for regulating the movement of the shaft for setting the cylinders at a predetermined position, and a release key for allowing the cylinders to resume their normal position.

6. A calculating machine comprising a frame, a shaft therein, cylinders loosely mounted upon the shaft one within the other and having cut-away portions to expose the periphery of the cylinders, a rule radially adjustable within said cut-away portions for bringing the rule against the calculating cylinders, a lever for locking the desired cylinder to the shaft and for radially moving the rule to rest upon the cylinders, a lever-operated means for independently locking the cylinders upon the shaft, means for operating said shaft, a lever for setting the machine and indicating the rate of interest, a key-operated mechanism for regulating the movement of the shaft for setting the cylinders at a predetermined position, and a release key for allowing the cylinders to resume their normal position.

7. A calculating machine comprising a frame, a shaft mounted therein, a series of cylinders mounted upon the shaft one within the other and having scales of figures arranged in longitudinal lines on their outer peripheries, said cylinders having longitudinal cut-away portions to expose the figures on the several cylinders, a rule radially adjustable in said openings, a plate indicating the rate of interest, a lever for operating said plate and moving the rule and setting the machine at the rate of interest, means for rotating the shaft, a key-operated mechanism for setting the cylinders at a predetermined position under the rule, and keys operating said mechanism for the different number of days of interest, and a release mechanism for releasing the mechanism to allow it to resume its normal position.

8. A calculating machine comprising a housing, a hollow shaft therein, a drum loosely mounted upon the shaft, cylinders loosely mounted upon the drum, one within the other, a rod longitudinally movable in the shaft, means carried by the rod for coupling any one of the cylinders to the drum, and means for rotating said drum, substantially as described.

9. A calculating machine comprising a housing, a hollow shaft therein, a drum loosely mounted upon the shaft, cylinders loosely mounted upon the drum one within the other, a rod longitudinally movable in the shaft, means carried by the rod for coupling any one of the cylinders to the drum, means for rotating said drum, and a key-operated mechanism for controlling the movement of the drum, substantially as described.

10. A calculating machine comprising a housing, a hollow shaft therein, a drum loosely mounted upon the shaft, cylinders loosely mounted upon the drum, one within the other, a rod longitudinally movable in the shaft, means carried by the rod for coupling any one of the cylinders to the drum, means for rotating said drum, a key-operated mechanism for regulating the movement of the drum, and a release key mechanism to allow the drum to return to its normal position.

11. A calculating machine comprising a casing, a shaft mounted therein, a drum loosely mounted upon the shaft, cylinders loosely mounted upon the drum, means for coupling any one of the cylinders to the drum, a disk rigidly carried by the drum, pegs carried by the disk, a key-operated mechanism for engaging the pegs and limiting the movement of the drum and cylinders carried thereby, and a release key-operated mechanism for allowing the drum to return to its normal position.

12. A calculating machine comprising a casing, a shaft mounted therein, a drum loosely mounted upon the shaft, cylinders loosely mounted upon the drum, means for coupling any one of the cylinders to the drum, a disk rigidly secured to the drum, a lever for operating the drums, pegs carried by one side of said disk, a key-operated mechanism in the path of said pegs for controlling the movement of said disk, and a release lever adapted to release the disk for allowing the cylinder to return to its normal position.

13. A calculating machine comprising a casing, a shaft mounted therein, a drum loosely mounted upon the shaft, cylinders loosely mounted upon the drum, a disk rigidly carried by the drum, pegs carried by the outer face of the disks, a gear carried by the drum, a lever-operated gear meshing with the gear carried by the drum and rotating the same, a set key operated and controlled mechanism for engaging the pegs of the disk for regulating the movement of the drum, and a release key mechanism for releasing the set key mechanism.

14. A calculating machine comprising a casing, a series of cylinders mounted therein one within the other and having cut-away portions in their outer periphery, a rule radially movable through said cut-away portions, means for oscillating the cylinders to bring a predetermined line of figures below the rule of a predetermined cylinder.

15. A calculator comprising a casing, a series of cylinders mounted therein one within the other and having cut-away portions to expose the periphery of the inner cylinders, the casing having a cut-away portion, a rule radially movable through the cut-away portions of the casing and the cylinders, a lever for coupling any one of the cylinders to the operative part of the machine, means operated by the lever for moving the rule to bring it close to the periphery of the coupled cylinder, and means for moving the cylinder to bring it in a position to expose a predetermined interest period.

16. A calculating machine comprising a casing, a series of cylinders mounted therein, one within the other and having cut-away portions to expose the periphery of the inner cylinders, a radially-movable rule mounted in the case and moving in the cut-away portion of the cylinders, a lever for coupling the desired cylinder to the operative parts of the machine, means operated by the lever for radially moving the rule to bring it upon the periphery of the cylinder locked to the operated mechanism, means operated by the lever for indicating the rate of interest, and means for moving the cylinder to bring it in a position to expose a predetermined interest period through the rule and the interest thereon for the amount directly above indicated on the rule.

17. A calculating machine comprising a casing, cylinders mounted therein and having interest period dates thereon and the amount of interest opposite the same in a horizontal line, the casing having a cut-away portion, means for operating any one of the cylinders, a key-controlled means for controlling the cylinder and stopping it at a predetermined point set by the keys, and means for releasing the cylinder to allow it to return to its normal position.

18. A calculating machine comprising a casing, a drum rotatably mounted therein, cylinders loosely mounted upon the drum one within the other and having cut-away portions to expose the inner cylinder, a lever pivoted to the casing and adapted to lock any one of the cylinders to the drum, a disk rigidly carried by the drum, pegs carried by the outer face of the disk, a key operated and controlled mechanism adapted to engage the pegs, a gear carried by the drum, a gear mounted upon the casing and meshing with the gear carried by the drum, a ratchet loosely mounted upon the shaft of the second mentioned gear, a spring connected to the ratchet, a pawl carried by the gear and engaging the ratchet, and a spring-pressed lever having a link connection with the ratchet adapted to move backward independent of the ratchet, substantially as described.

In testimony whereof I affix my signature in presence of two witnesses.

IVAR MOE.

Witnesses:
NORMAN E. LA MOND,
S. GEO. STEVENS.